US011451406B2

(12) United States Patent
Chen

(10) Patent No.: US 11,451,406 B2
(45) Date of Patent: Sep. 20, 2022

(54) CROSS-CHAIN MESSAGING AND MESSAGE VALIDATION

(71) Applicant: MOAC BLOCKCHAIN TECH INC, Palo Alto, CA (US)

(72) Inventor: Xiaohu Chen, Mountain View, CA (US)

(73) Assignee: MOAC BLOCKCHAIN TECH INC, Palo Alto, CA (US)

( * ) Notice: Subject to any disclaimer, the term of this patent is extended or adjusted under 35 U.S.C. 154(b) by 552 days.

(21) Appl. No.: 16/375,631

(22) Filed: Apr. 4, 2019

(65) Prior Publication Data

US 2020/0322175 A1   Oct. 8, 2020

(51) Int. Cl.
| | | |
|---|---|---|
| *H04L 9/32* | (2006.01) | |
| *G06F 9/50* | (2006.01) | |
| *H04L 9/30* | (2006.01) | |
| *H04L 9/06* | (2006.01) | |

(52) U.S. Cl.
CPC .......... *H04L 9/3271* (2013.01); *G06F 9/5061* (2013.01); *H04L 9/0637* (2013.01); *H04L 9/3066* (2013.01); *H04L 9/3236* (2013.01); *H04L 9/3247* (2013.01)

(58) Field of Classification Search
CPC ... H04L 9/3271; H04L 9/3255; H04L 9/3247; H04L 9/0637; H04L 9/3239; H04L 9/085; H04L 9/3066; H04L 9/3236; H04L 2209/38; G06F 9/5061
USPC ....................................................... 713/168
See application file for complete search history.

(56) References Cited

U.S. PATENT DOCUMENTS

| | | | | |
|---|---|---|---|---|
| 8,788,830 | B2 * | 7/2014 | Piersol ...................... | H04L 9/32 |
| | | | | 713/176 |
| 10,999,063 | B2 * | 5/2021 | Blake ....................... | H04L 67/20 |
| 2009/0327735 | A1 * | 12/2009 | Feng ...................... | H04L 9/0891 |
| | | | | 713/180 |
| 2019/0236298 | A1 * | 8/2019 | Agarwal ................ | H04L 9/3239 |
| 2019/0375373 | A1 * | 12/2019 | Pepe ...................... | H04L 9/3247 |
| 2020/0118068 | A1 * | 4/2020 | Turetsky ................ | G06Q 20/06 |
| 2020/0213099 | A1 * | 7/2020 | Wright .................. | H04L 9/3236 |
| 2021/0091934 | A1 * | 3/2021 | Fletcher ............. | G06Q 20/3829 |

* cited by examiner

*Primary Examiner* — Amare F Tabor

(57) ABSTRACT

The current disclosure is directed towards providing methods and mechanisms enabling computationally efficient cross-chain messaging and message validation between subchains of a large-scale decentralized network. In one example, the current disclosure provides for determining if a message generated by a first subchain, received at a second subchain, represents a valid, consensually generated message of the first subchain, by comparing the received message with a public-key-share list of the first subchain stored in the second subchain. In one example, the current disclosure provides for a method comprising receiving a first message from a first subchain at a smart contract of a second subchain, wherein the smart contract of the second subchain comprises a public-key-share list of the first subchain, determining if the first message is valid based on the public-key-share list, and executing a transaction based on the first message responsive to the first message being determined valid.

21 Claims, 7 Drawing Sheets

CROSS-CHAIN MESSAGING AND MESSAGE VALIDATION

TECHNICAL FIELD

The present description relates generally to methods and mechanisms for sending, receiving and validating messages between subchains within a large-scale peer-to-peer network.

BACKGROUND

In a large-scale decentralized network, such as a blockchain system (e.g. the Bitcoin network, the Ethereum network etc.), the ability to process a task (transaction or smart contract call) on-chain is very important. However, a recognized challenge in the field of blockchain technology is increasing the number of parallel tasks/transactions the large-scale decentralized network can process, while maintaining the security and immutability of the blockchain maintained by the network. One approach to increase the number and/or complexity of tasks a large-scale decentralized network is able to process at any one time, while maintaining the security and immutability of the blockchain, is to divide the large number of nodes of the large-scale decentralized network into subchains (also referred to as shards, and microchains), where each subchain may process distinct tasks, thereby increasing the total number of parallel tasks a large-scale decentralized network may process at a given time.

However, subdividing a large-scale decentralized network into multiple subchains poses additional challenges. For example, exchange of information between subchains (herein also referred to as cross-chain messaging and cross-chain communication) may occur by transmitting and receiving messages. During such exchanges of information, malicious actors may generate forged messages and/or tamper with messages, potentially compromising the security of the large-scale decentralized network.

Previous approaches directed towards mitigating the above issue may have comprised a first node in a first subchain signing a message using a private key, and sending the message to a second node in a second subchain. The second node in the second subchain may then validate the signature produced by the first node (and included in the message) using a public key of the first node, thereby enabling messages to be sent from the first subchain to the second subchain while reducing the probability that a forged/altered message will be accepted as valid.

However, the inventors herein have identified issues with these previous approaches. In one example, the first node and the second node each act as a single point of failure, where, if either the first or second node is compromised, communication between the first subchain and the second subchain may be compromised. Additionally, such previous approaches are centralized, and therefore, a recipient of a message generated in this manner may be unable to determine if the message comprises a consensually achieved message of the first subchain. That is, a recipient of the message may be unable to determine how many nodes of the first subchain agreed to send the message (or agreed to the contents of the message) and how many did not agree. This may allow individual nodes of the first subchain to send messages which are not approved by a consensus of the first subchain, thereby undermining the validity of messages produced by nodes of the first sub chain.

Previous approaches directed towards decentralizing cross-chain communication may additionally or alternatively comprise transmission of a plurality of messages from a first subchain to a second subchain, wherein each of the plurality of messages is generated by a different member node of the first subchain, thereby enabling the second subchain to directly determine a consensus message of the first subchain based on the plurality of messages. For example, each member node of a first subchain may cast a vote either for a first transaction or for a second transaction, by generating a message and transmitting the message to a second subchain, wherein the messages generated by the member nodes may indicate the elected transaction. The second subchain may then tally the messages/votes received from the member nodes of the first subchain and determine which of the two transactions to execute by selecting the transaction which received the majority of the votes. In this way, no single node may act as a single point of failure, and no single node may possess unilateral control over cross-chain messages sent to external subchains.

However, the inventors herein have also identified issues with the above previous approaches. In one example, the second subchain may have difficulty determining the authenticity of the plurality of messages received from the first subchain. That is, the second subchain may have difficulty determining if each of the received messages of the plurality of messages originated from the first subchain, and was unaltered, as the identity of each member node of the first subchain may not be known by nodes outside of the first subchain. In a second example, the above approach teaches transmitting a plurality of messages, which may unnecessarily consume computational resources/bandwidth of the large-scale decentralized network, and may inhibit implementation of the method in cases where subchains comprise a large number of member nodes (in other words, the above approach does not scale efficiently).

Thus, a recognized challenge in the field of decentralized communication between subchains is determining if a message received at a second subchain from a first subchain represents an authentic, consensually generated message of the first subchain. A further challenge in the field of decentralized inter-chain communication comprises validating the authenticity of received messages, while reducing the amount of computational resources/cross-chain messages used to achieve this validation. It is therefore desirable to provide for cross-chain messaging which is both secure and decentralized, in order to reduce a probability of an altered or forged message being received as valid/authentic. It is further desirable to provide this secure and decentralized cross-chain messaging in a computationally efficient manner, in order to reduce the time and computational resources used during cross-chain communication. The concepts disclosed below at least partially address these needs and others.

SUMMARY

The current disclosure provides methods and mechanisms enabling computationally efficient cross-chain messaging and message validation between subchains of a large-scale decentralized network. In one example, the current disclosure provides for a method comprising: receiving a first message from a first subchain at a smart contract of a second subchain, wherein the smart contract of the second subchain comprises a public-key-share list of the first subchain; determining if the first message is valid based on the public-key-share list; and executing a transaction based on the first message responsive to the first message being determined valid. In this way, a subchain receiving a message from an external subchain may determine if the message was produced by a consensus protocol of the external subchain (and therefore represents a valid message of the external subchain, and not a malicious message and/or a forged/altered message) based upon transmission of a single message, thereby achieving the technical advantage of reducing an amount of computational resources employed for cross-chain messaging while reducing susceptibility of subchains to falsified messages.

Further, the approach of the current disclosure is decentralized, as cross-chain message generation and validation is implemented by smart contracts which may be implemented by a plurality of distributed member nodes of the subchains. Therefore the technical advantages of decentralizing the process of cross-chain messaging, such that no single point of failure exists and ensuring that secure cross-chain messaging may continue even if one or more nodes fail, may be achieved.

In a second example, the current disclosure provides for a cross-chain messaging mechanism in a first subchain comprising: a network interface; a processor coupled to the network interface; and a memory coupled to the processor comprising a public-key-share list and instructions executable by the processor to: receive a message from a second subchain via the network interface; determine if the message is valid based the public-key-share list; and respond to the message being concluded valid by executing a transaction based on the message, wherein the public-key-share list comprises a first plurality of public-key-shares corresponding to the plurality of nodes of the second subchain.

In a third example, the current disclosure provides for a method comprising: receiving a message at a first subchain from a second subchain, wherein the first subchain comprises a public-key-share list of the second subchain; determining if the message satisfies at least a first validation criterion and a second validation criterion based on the public-key-share list; and responsive to the first validation criterion and the second validation criterion being satisfied: executing a transaction in the first subchain based on the message.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

Various aspects of apparatuses and methods will now be presented in the detailed description by way of example, and not by way of limitation, with reference to the accompanying drawings, wherein.

DETAILED DESCRIPTION

Figure 1:
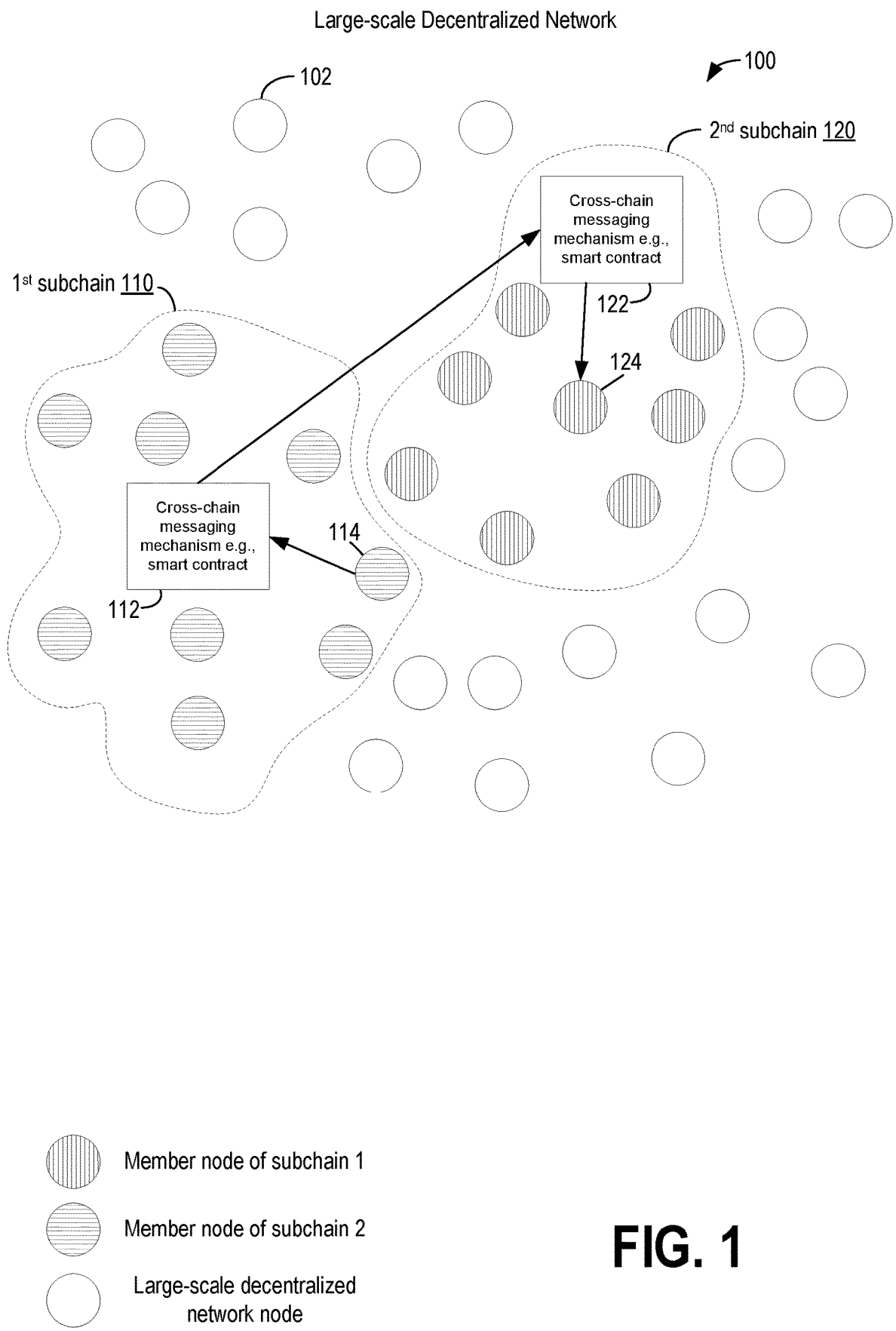
FIG. 1 is an illustration of a large-scale decentralized network, including a first subchain and a second subchain.

The current disclosure provides methods and mechanisms for cross-chain messaging, and cross-chain message validation, in a decentralized and computationally efficient manner using threshold signatures (threshold sigs.). FIG. 1 illustrates a first subchain communicating with a second subchain via message. The subchains of FIG. 1 may implement a method, such as method 200 shown in FIG. 2 to generate a message via a cross-chain messaging mechanism/smart contract. Method 200 may comprise aggregating a threshold number, m, of signature shares (sig. shares) from member nodes of the first subchain, wherein each member node which signs the message with its unique sig. share may also add its public-key-share to the message. Once m or more distinct sig. shares are aggregated within the message, the cross-chain messaging mechanism may determine a threshold sig. from the m or more sig. shares, and the threshold sig., wherein the threshold sig. indicates that the message is approved by a consensus of the member nodes of the first subchain according to a pre-agreed-upon consensus protocol. In one example, a consensus protocol may comprise an m-of-n protocol, wherein a decision may only be executed in response to approval by m member nodes (where m is an integer greater than 1 and less than or equal to n) of n total member nodes (where n is an integer greater than 1), such as approval of a message transmission request. One example of an m-of-n consensus protocol may be a 3-of-5 protocol, wherein approval of 3 member nodes of 5 total member nodes may be needed to approve an action/decision/message/etc. In another example, an m-of-n protocol may comprise a 5-of-5, a 2-of-10, or a 4-of-100 protocol.

The message may then be sent from the cross-chain messaging mechanism of the first subchain to a second subchain. FIG. 3 shows one example of a method 300 for validating a message, such as the message discussed above in reference to FIG. 2, received at a second subchain from a first subchain. Within the second subchain, a transaction may be executed based on the message only if the message meets one or more validation criteria based on, in at least one example, a plurality of public-key-shares included in the message matching with public-key-shares contained within a public-key-share list of the first subchain stored in the second subchain. Or in a second example, the validation criteria may be based on a threshold sig. included within the message being validated by a group public key, derived from m of n public key shares of the public key shares list of the first subchain stored in the second subchain.

Figure 4:
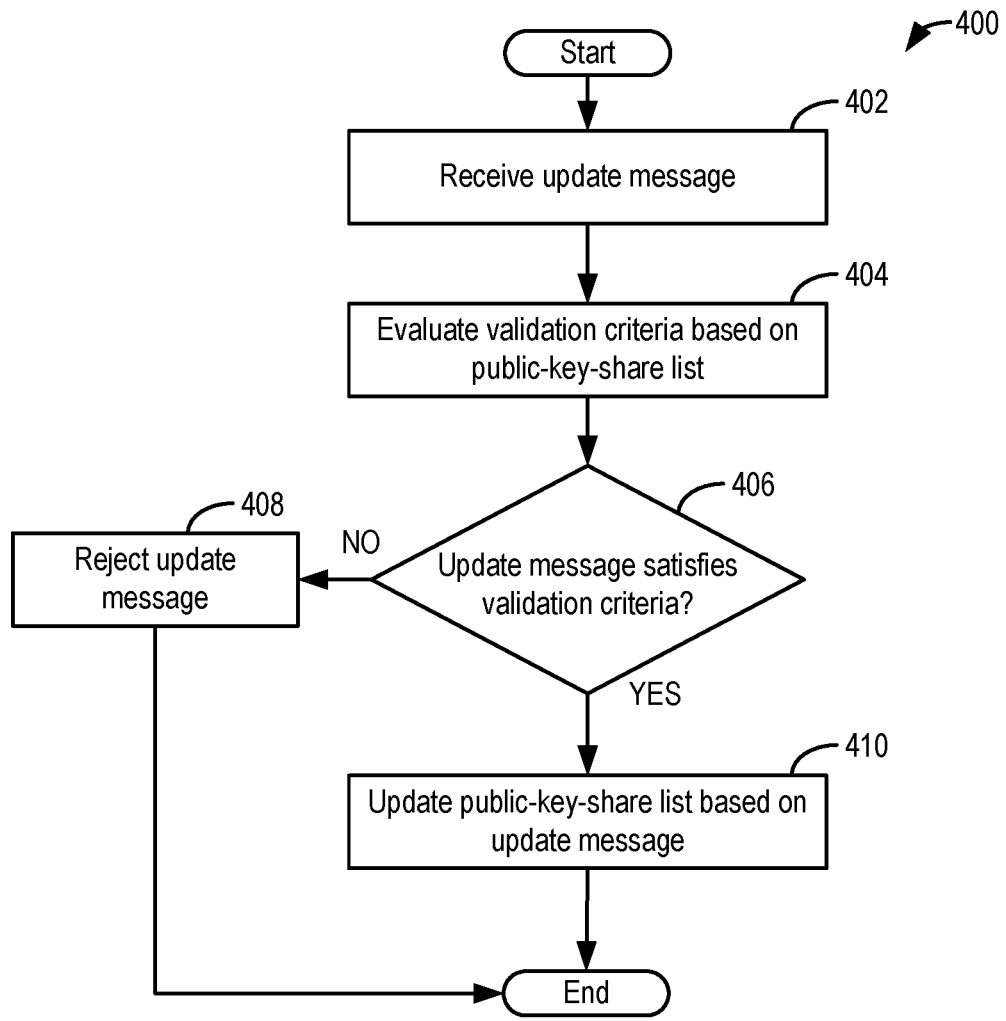
FIG. 4 shows a high level flowchart of a method for updating a public-key-share list.

Nodes may join, or leave, a subchain, and therefore information regarding the member nodes of a first subchain stored in a second subchain (e.g., a list of each member node of the first subchain, such as may be indicated by node ID, and/or a list of each member node's public-key-share), such as may be used for message validation, may need to be updated to reflect the current state of the first subchain. FIG. 4 provides an example of a method 400 for updating a public-key-share list of a first subchain stored in a second subchain upon receipt of an update message by the second subchain from the first subchain. The updated public-key-share list may be used to construct an updated group public key, which may be used to decrypt and validate threshold sigs. of the first subchain.

Figure 5:
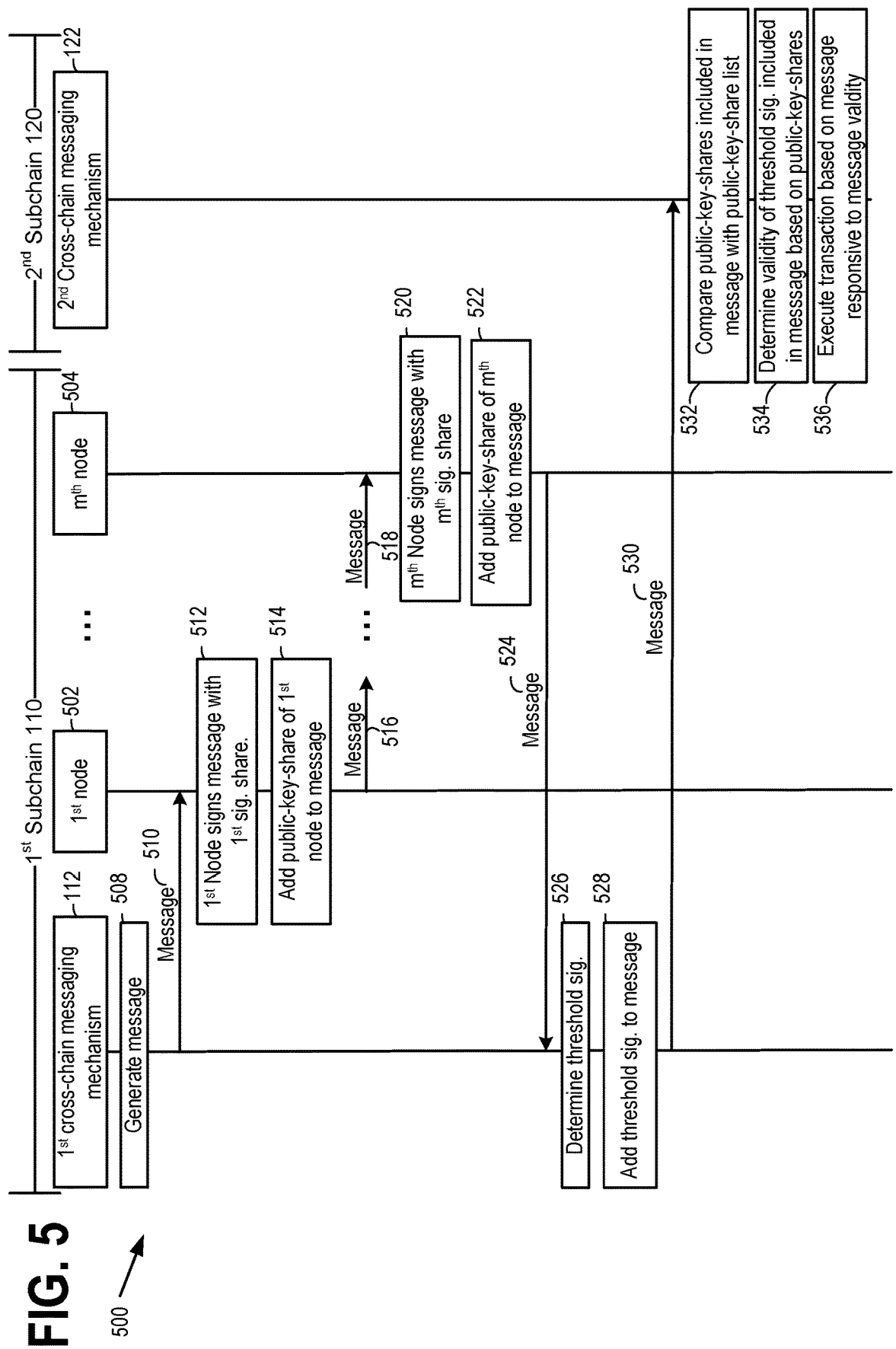
FIG. 5 shows a flow diagram of a process for generating a message in a first subchain, and validating the message at a second subchain.

At FIG. 5, a prophetic example shown by flow diagram 500 comprises a cross-chain messaging mechanism aggregating a threshold, integer number, m, of sig. shares, and public-key-shares within a message, from member nodes of a first subchain. Once the message has aggregated m or more sig. shares (and optionally, m or more public-key-shares), the message is then signed by appending a threshold sig., determined based on the m sig. shares (and further based on the contents of the message), to the message. Once the message has been signed. the message may be transmitted to a second subchain. Flow diagram 500 further comprises the second subchain validating the message by verifying the threshold sig. included in the message using the public-key-share list of the first subchain stored in the second subchain. If the second subchain determines that the threshold sig. included within the message comprises a valid signature produced by m or more member nodes of the first subchain, and optionally, if the second subchain determines that each of the public-key-shares of the first subchain, included in the message received by the second subchain, correspond/match with public-key-shares within a public-key-share list of the first subchain stored in the second subchain, the second subchain may conclude that the received message was not tampered with or forged and was consensually produced by the member nodes of the first subchain. In this way, method 500 may provide at least a first and a second cross-chain message validation criterion based on a public-key-share list of the first subchain stored in the second subchain.

Figure 6:
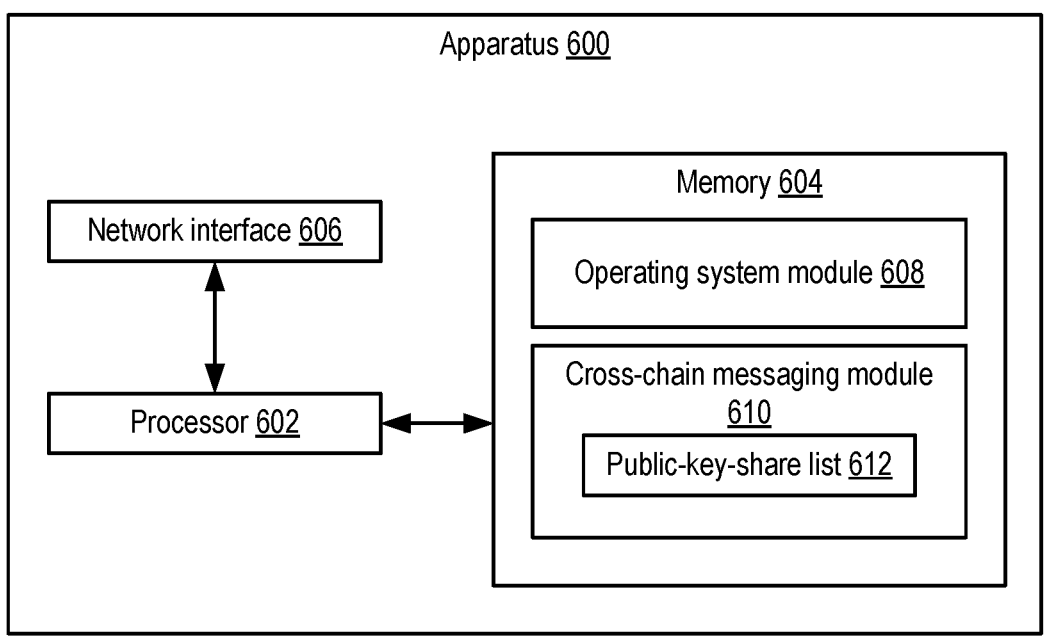
FIG. 6 shows a block diagram illustrating an apparatus, which in one embodiment may comprise a cross-chain messaging mechanism.
Figure 7:
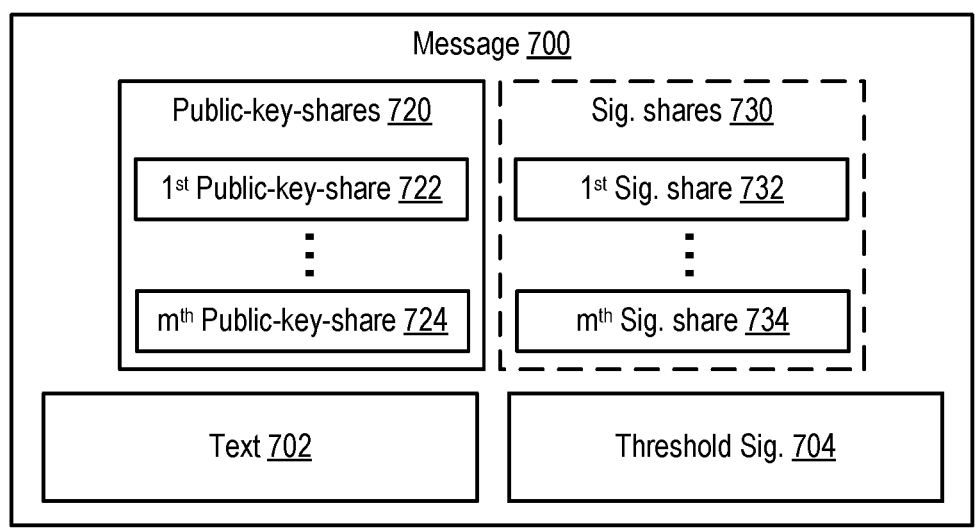
FIG. 7 shows an example of a message according to embodiments of the current disclosure.

FIG. 6 provides one example of an apparatus 600 by which the methods disclosed herein may be executed and enabled. FIG. 7 provides one example of a message 700, such as the message discussed above in reference to FIGS. 1-6, which may include a threshold sig., text/message contents (which may, in one example, include a transaction), and may optionally include a plurality of public-key-shares corresponding to the plurality sig. shares contributed by a plurality of member nodes of the first subchain.

It is noted that the messages described herein relate to electronic messages. Thus, transmission of such messages may involve electronic signaling between nodes of the subchains. In one example, a message may be transmitted by specifying a destination address, wherein the destination address indicates a network location of a receiver. In one example, a destination address may comprise a wallet address. As an example, a wallet address may comprise an address of a node, a smart contract, etc. which may be maintained within a blockchain implemented by a group of nodes, such as a node pool, a subchain, a large-scale decentralized network, etc. In one example, electronic signaling may comprise transfer of information via electronic signals, such as current, voltage etc. In a more specific example, electronic signaling may occur according to any conventionally known method used in the art of digital communication.

As used herein, the term "on-chain" will be recognized to mean an action, process, transaction, computation, or other occurrence, which is generated and/or immutably recorded on a distributed ledger (herein also referred to as a blockchain). Data generated "on-chain" may refer to data derived from one or more pieces of data previously stored on a blockchain/distributed ledger, such that data derived in this manner may be validated by other nodes of the blockchain. It will be appreciated that as a non-limiting example, sig. shares, and threshold sigs. may refer to signatures according to the Boneh-Lynn-Shacham (BLS) signature scheme. In another example, sig. shares and threshold sigs., may be in reference to an Elliptic Curve Digital Signature Algorithm (ECDSA), or other signature scheme.

Sig. shares may be generated from messages using secret shares (also referred to herein as private-key-shares), wherein, a secret share may, in one example, comprise a string of characters of finite length. In one example, a node may compute a hash of a message, and a secret share may be used encrypt the hash of the message to produce a sig. share for the message. Each secret share/private-key-share may have a corresponding public-key-share, wherein information encrypted by a secret share may be decrypted using the corresponding public-key-share of the secret share. Any m or more sig. shares may be used to determine a threshold sig. (where m is a positive integer greater than 1), while any m−1 or less sig. shares may be unable to derive any information regarding the threshold sig. Thus, in one example, a group of n members, wherein each member possesses a single unique secret share/public-key-share, and wherein no member knows the threshold sig. for a given message, may derive/determine the threshold sig. for the message by cooperating with m−1 other members (where the threshold number, m, is not greater than the total number of members of the group, n). In other words, a first member of a group of n members may produce a threshold sig. for a message by acquiring m−1 sig. shares for the message from m−1 other group members, which when combined with the first member's sig. share produces m sig. shares, which may be used to derive the threshold sig. for the message, wherein no member of the group is aware of the identity of the threshold sig. for the message until after m sig. shares are combined and polynomial interpolation is used to determine the threshold sig. Once a threshold sig. is determined, the other group members may validate that the threshold sig. determined by the first member is valid, by performing a second validation of the threshold sig. based on the m or more sig. shares.

Turning now to FIG. 1, a large-scale decentralized network 100 is shown. In one example, large-scale decentralized network 100 may comprise a large number of distributed nodes 102 forming a large-scale decentralized network or system. In one example, each node of the large-scale decentralized network 100 may be communicatively coupled with at least one other node 102 of the large-scale decentralized network 100. In another example, each node of the large-scale decentralized network 100 may be communicatively coupled to a plurality of other nodes of large-scale decentralized network 100 or to each other node of the large-scale decentralized network 100. In one example, nodes 102 of the large-scale decentralized network may be communicatively coupled via a digital network, such as the Internet. The number of nodes 102 in the large-scale decentralized network 100 may be, for example, around 10,000. Nodes 102 within the large-scale decentralized network 100 may be logically grouped into subchains (subchains may also be referred to herein as application shards, node pools, and microchains), such as first subchain 110 and second subchain 120. While a large number of nodes 102 and subchains 110, 120 may be present in a large-scale decentralized network, for ease of illustration, a reduced number of nodes and subchains are shown in FIG. 1.

The first subchain 110 and second subchain 120 represent logical groupings of nodes 102 within the large-scale decentralized network 100. The groupings of nodes into subchains may be based on the needs of an application being run on the nodes of the subchains such as a decentralized application (DAPP). DAPPs may perform functions similar to those of conventional applications, such as music streaming, computation, data storage, game hosting, transaction processing, identity validation, digital rights management, etc. but with the benefit of being decentralized, transparent, immutable, and trustless. Subchains, such as first subchain 110 and second subchain 120 may comprise member nodes grouped together to perform a function, perform a calculation, render a service, implement a smart contract, or perform other actions. The number of member nodes within a subchain and the configuration of member nodes within a subchain may be based on the service or function for which the subchain is configured. In one example, a subchain such as first subchain 110 and second subchain 120 may comprise one or more member nodes executing/implementing a smart contract, such as first cross-chain messaging mechanism 112 or second cross-chain messaging mechanism 122, as detailed below, wherein the smart contract may comprise instructions shared across the member nodes of the subchain, which enable said nodes to execute complex behaviors/methods in concert. First subchain 110 and/or second subchain 120 may remain in communication with external nodes, such as external node 102, of the large-scale decentralized network 100, thereby enabling information to flow between the member nodes of subchains 110, 120 and the nodes 102 of the large-scale decentralized network 100, or between the member nodes of first subchain 110 (member nodes of first subchain 110 are shown in FIG. 1 with a horizontal line pattern) and the member nodes of second subchain 120 (shown in FIG. 1 with a vertical line pattern). The communicative coupling between nodes of the first subchain 110, second subchain 120, and large-scale decentralized network nodes 102 may enable data originating outside of a given subchain (e.g., first subchain 110, second subchain 120) to be transferred to, and stored in, said subchain, or conversely, to enable data generated by said subchain to flow to other nodes 102 of the large-scale decentralized network 100. One or more nodes of the large-scale decentralized network 100, such as node 102, may be added to a subchain and conversely, nodes may be removed from a subchain and returned to the general pool of nodes comprising the large-scale decentralized network 100. In one example, nodes 102 may be added to a subchain based on a total number of computations/transactions being processed by said subchain exceeding a threshold number of computations/transactions, thereby enabling a speed of computation within said subchain to be maintained within pre-determined thresholds.

In the example shown in FIG. 1, each of first subchain 110 and second subchain 120 comprise a plurality of member nodes executing a smart contract, such as first cross-chain messaging mechanism 112 and second cross-chain messaging mechanism 122, respectively. In one example, the cross-chain messaging mechanisms 112 and 122 may comprise instructions stored in non-transitory memory of one or more member nodes comprising first subchain 110, or second subchain 120, that when executed perform one or more of the steps described below with reference to methods 200, 300, 400, and 500. The components of cross-chain messaging mechanisms 112, 122 may be discussed in further detail in reference to FIG. 6 hereinbelow.

In some examples, each of n member nodes, such as first member node 114, of first subchain 110 (wherein n is a positive integer greater than 1) may comprise a secret share (generated based on a verifiable secret sharing method), wherein a node's secret share may be used to generate signature shares (herein abbreviated as sig. shares) specific to the node. As used herein, the term secret share may be used interchangeably with the term private-key-share. In one example, a node's secret share may comprise a secret share according to a BLS signature scheme, and may therefore have the properties of a BLS signature. A node's sig. share may be validated using a corresponding public-key-share and signed message, analogous to the process by which a signature generated using a private key may be verified by a corresponding public key in asymmetric key cryptography. Thus, each of the n member nodes of the first subchain 110 may sign messages with a sig. share uniquely corresponding to the signing member node. Each member node of first subchain 110 may comprise unique secret shares/private key shares, and may therefore generate unique sig shares. In another example, each member node that signs a message may add its public-key-share to the message, indicating to which member node a given sig. share corresponds (that is, indicating from which member node the sig. share originates).

The first cross-chain messaging mechanism 112 may be configured to propagate messages amongst the n member nodes, such as first member node 114, of first subchain 110, and upon a message being signed with m or more sig. shares, generate a threshold signature (threshold sig.) from the m sig. shares and add the threshold sig. to the message (wherein m is a predetermined, positive integer, not greater than n, and greater than 1). The threshold sig. may only be generated upon aggregation of m or more sig. shares, and may therefore indicate that a message has been approved by m or more of then member nodes of first subchain 110. Thus, a message may be generated by first subchain 110, wherein the message comprises a threshold sig. produced by m or more member nodes, and optionally the message may contain the m or more public-key-shares corresponding to the m or more member nodes, the message body that the sig shares sign on, and public-key-shares. The message may then be transmitted from first cross-chain messaging mechanism 112 in first subchain 110 to second cross-chain messaging mechanism 122 in the second subchain 120, where the message may be received, such as via a network interface. The second cross-chain messaging mechanism 122 may then determine if the message is valid based on the threshold sig. and a public-key-share list of the first subchain 110. The message may at least include the threshold sig. generated by the first cross-chain messaging mechanism 112, the message body that the sig. shares sign on, and public-key-shares of the m or more signing member nodes. As such, a validation method (e.g., method 300) may be executed by the second subchain 120 upon receipt of a message by the second subchain 120 from an external subchain (e.g., first subchain 110) wherein the second cross-chain messaging mechanism 122 may determine the validity of the threshold sig. included within the message based on the public-key-share list. Responsive to the threshold sig. being validated based on the public-key-share list, the validation method may conclude that the message is valid. In some examples, the second cross-chain messaging mechanism 122 may further compare the public-key-shares included within a transmitted message against a public-key-share list of the member nodes of the transmitting subchain (e.g., the first subchain 110 in the example depicted by FIG. 1).

Once the message is determined to be valid, the second cross-chain messaging mechanism 122 may be configured to generate a response message and then propagate said response message amongst the n' member nodes of the second subchain 120, such as second member node 124, of the second subchain 120. Upon the response message being signed by m' or more member nodes of the second subchain 120, as indicated by the m' or more sig. shares added to the message, the second cross-chain messaging mechanism 122 may generate a threshold sig. from the m' sig. shares and add the threshold sig. to the response message (wherein m' is a predetermined, positive integer, less than n', and greater than 1). The threshold sig. may only be generated upon aggregation of m' or more sig. shares, and may therefore indicate that the response message has been approved by m' or more of the n' total member nodes of second subchain 120. Thus, a response message may be generated by second subchain 120, wherein the response message comprises a threshold sig. generated from m' or more aggregated sig. shares, and may optionally include m' or more public-key-shares corresponding to the m' or more member nodes of the second subchain 120. The response message may then be transmitted from second cross-chain messaging mechanism 122 in second subchain 120 to another cross-chain messaging mechanism in another subchain, such as the first cross-chain messaging mechanism 112 in first subchain 110. In this way, second cross-chain messaging mechanism 122 of second subchain 120 may, in some examples, be configured to operate in a substantially similar manner to first cross-chain messaging mechanism 112 of first subchain 110.

FIGS. 2-5 show methods for cross-chain messaging communication and validation. The methods detailed therein may be performed, for example, by the n member nodes, such as first member node 114, within first subchain 110 (operating in conjunction with first cross-chain messaging mechanism 112), together with the n' member nodes, such as second member node 124, within second subchain 120 (operating in conjunction with second cross-chain messaging mechanism 122).

Figure 2:
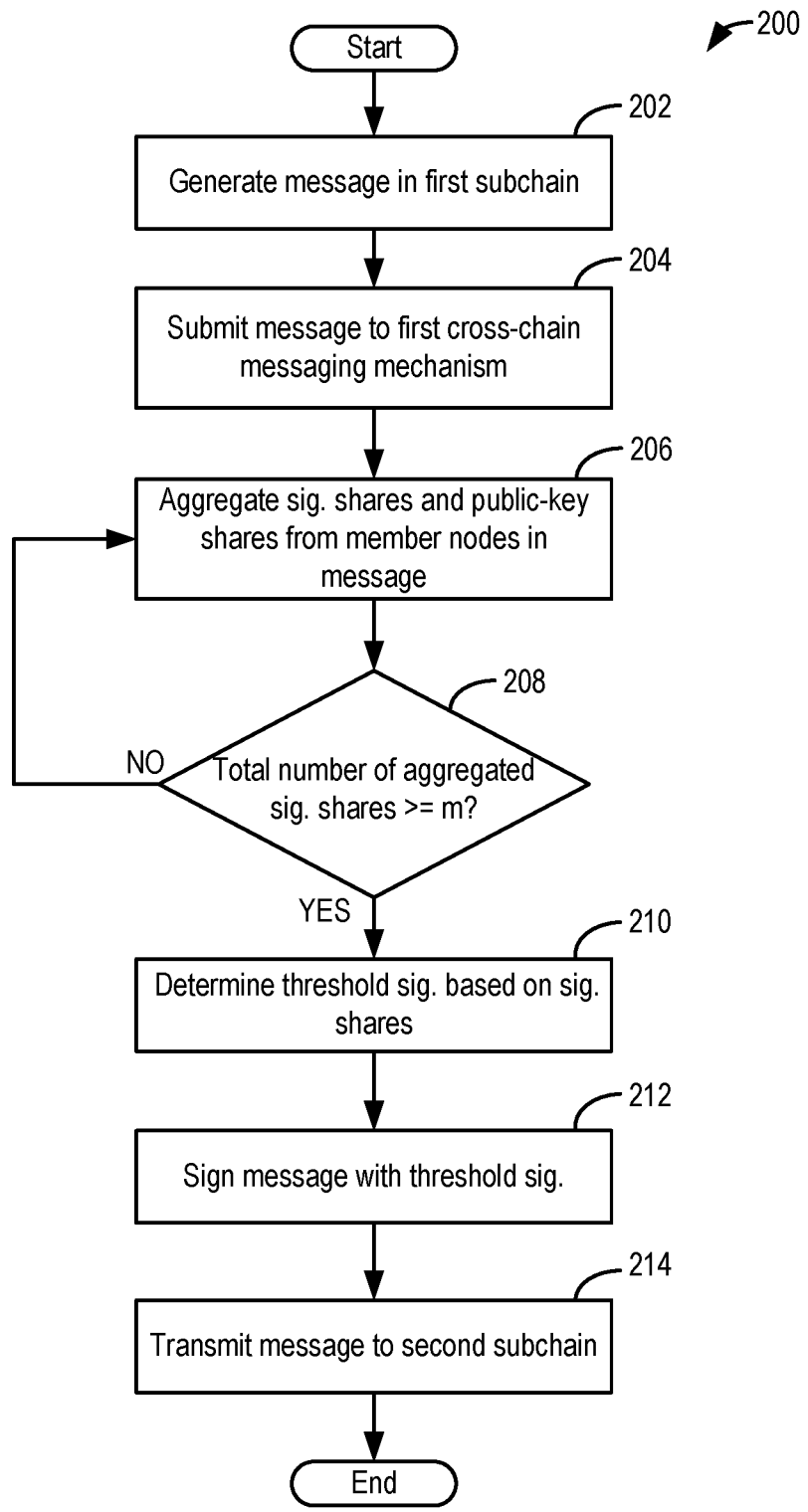
FIG. 2 shows a high level flowchart of a method for generating messages in a subchain in a consensual and a decentralized manner.
Figure 3:
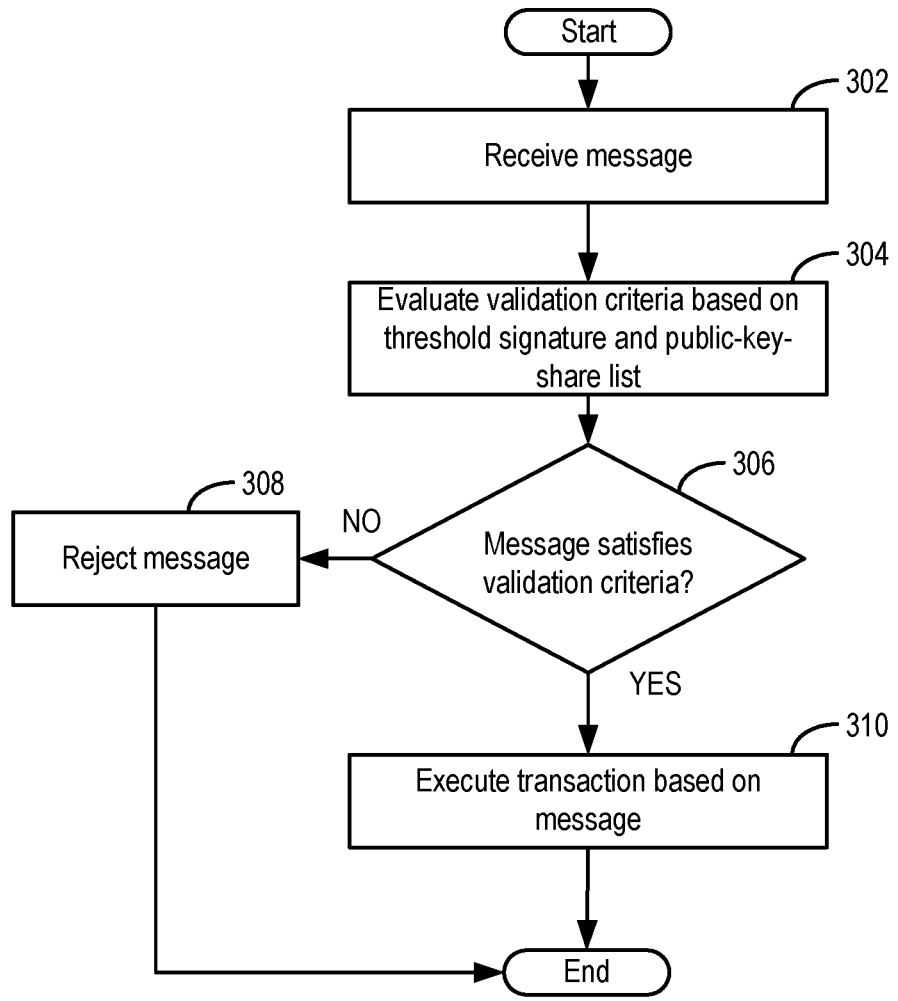
FIG. 3 shows a high level flowchart of a method for validating received messages in a subchain based on public-key-share list.

Turning now to FIG. 2, a flowchart of an example method 200 for cross-chain messaging communication is shown. In the example communication in the flowchart of FIG. 2, the direction of communication is from first subchain 110 to second subchain 120. In other examples, the direction of communication may be from second subchain 120 to first subchain 110, from first subchain 110 to another subchain, or from second subchain 120 to another subchain, where another subchain may be neither first subchain 110 or second subchain 120.

At block 202, a message may be generated in first subchain 110. The message may be generated, for example, in response to a previously received message, a completed transaction, a function call, a request for data, a request for an amount of funds to be transferred from a first address of first subchain 110 to a second address of second subchain 120, etc. In some examples, the message may be generated based on a transaction executed by a smart contract, such as first cross-chain messaging mechanism 112.

At block 204, the message may be submitted to first cross-chain messaging mechanism 112. Therein, first cross-chain messaging mechanism 112 may be operable to propagate the message through the n member nodes, such as member node 114, of first subchain 110.

At block 206, sig. shares from one or more of the n member nodes may be aggregated in the message. First cross-chain messaging mechanism 112 may propagate the message to one or more of the n member nodes, such as first member node 114, within first subchain 110, whereby the one or more of the n member nodes may sign the message with a sig. share, and may optionally include a public-key-share corresponding to the sig. share. The sig. shares are thus aggregated within the message to be evaluated by first cross-chain messaging mechanism 112.

At block 208, first cross-chain messaging mechanism 112 may determine whether or not a total number of aggregated sig. shares is greater than or equal to m (wherein, as above, m is a predetermined, positive integer, not greater than n, and greater than 1). If first cross-chain messaging mechanism 112 determines that the total number of aggregated sig. shares is less than m, method 200 returns to block 206 to continue aggregating sig. shares from the one or more of the n member nodes in the message.

At block 210, if first cross-chain messaging mechanism 112 determines that the total number of aggregated sig. shares is greater than or equal to m (e.g., if a threshold number of sig. shares within the message has been reached), then a threshold sig. (e.g., first threshold sig.) is determined based on the sig. shares. In some examples, first cross-chain messaging mechanism 112 may generate the threshold sig. from the m sig. shares via polynomial interpolation.

At block 212, first cross-chain messaging mechanism 112 may sign the message with the threshold sig. As such, the threshold sig. may indicate that the message is approved by consensus of m of n member nodes of first subchain 110.

At block, 214, the message may be transmitted to second subchain 120. Therein, in some examples, the message may be received by second cross-chain messaging mechanism 122, as discussed in detail below in reference to FIG. 3. Method 200 then ends.

Turning to FIG. 3, a flowchart of an example method 300 for cross-chain message validation is shown. In the example validation shown in the flowchart of FIG. 3, the second subchain 120 receives a message from the first subchain 110. In other examples, first subchain 110 may receive a message from second subchain 120, first subchain 110 may receive a message from another subchain, or second subchain 120 may receive a message from another subchain, where another subchain may be neither first subchain 110 or second subchain 120.

At block 302, the message may be received at a smart contract, such as second cross-chain messaging mechanism 122, of second subchain 120. In one example, the message may originate at another smart contract, such as first cross-chain messaging mechanism 112 of first subchain 110. Second cross-chain messaging mechanism 122 may include a node ID list of a first plurality of node IDs corresponding to a plurality of nodes, such as the n member nodes, of first subchain 110 and a public-key-share list of a first plurality of public-key-shares corresponding to the plurality of nodes of first subchain 110. Further, the message may include a threshold sig. (e.g., generated by another smart contract, such as first cross-chain messaging mechanism 112), and a plurality of public-key-shares corresponding to the member nodes of the first subchain that signed the message. In one example, the number of public-key-shares included within the message may equal the total number of member nodes of the subchain from which the message originated. After the message has been received at the smart contract, and as described at further blocks of method 300, second cross-chain messaging mechanism 122 may then determine if the message is valid based on threshold sig., the contents of the message, and the public-key-share list.

At block 304, validation criteria of the message may be assessed based on the threshold sig. included in the message, the public-key-shares included within the message, the contents of the message, and the public-key-share list stored in the receiving (second) subchain. In one example, the validation criteria may include determining if the threshold sig.

included within the message is valid using the public-key-share list stored in the second subchain. In another example, validating the threshold sig. may comprise generating a group public key based on the public-key-shares included in the public-key-share list, and using the group public key to decrypt the threshold sig., wherein if the value determined based on the decrypted threshold sig. matches a hash computed based on the contents of the message, the message may be determined valid, and conversely, if the value determined by decrypting the threshold sig. does not match a hash computed based on the contents of the message, it may be determined that the message is invalid/has been forged/tampered with. In a second example, a validation criteria of an cross-chain message may comprise determining if each public-key-share included within the message is also included within the public-key-share list of the first subchain stored at the second subchain, and the message may be invalidated in response to one or more public-key-shares of the message not being included within the public-key-share list. In another example, a validation criterion which may be used for validating or invalidating a cross-chain message may comprise determining if the threshold sig. included within the message is valid, by decrypting the threshold sig. to obtain a first hash using a public-key (also referred to herein as a group public-key) generated from the plurality of public-key-shares included within the message. In one example, a hash may be determined for a message using a hashing algorithm, such a SHA-256 hashing algorithm, or any other one way hashing algorithm known in the art of cryptography. The receiving (second) subchain, may compute a second hash based on the contents of the received message using a hashing algorithm. Responsive to the first hash not equaling the second hash, a cross-chain messaging mechanism may determine that the threshold sig. included within a message is not valid. Conversely, responsive to the first hash equaling the second hash, a cross-chain messaging mechanism may determine that the threshold sig. included within a message is valid. Further embodiments of validation criteria as detailed elsewhere herein may be added or substituted to the validation criteria described in reference to block 304 without limiting the scope of method 300.

At block 306, second cross-chain messaging mechanism 122 may determine whether or not the message satisfies the validation criteria. In some examples, second cross-chain messaging mechanism 122 determining whether or not the message satisfies the validation criteria may include satisfying each of a plurality of validation criteria. For example, second cross-chain messaging mechanism 122 determining whether or not the message satisfies the validation criteria may include satisfying each of a first validation criterion and a second validation criterion. In some examples, responsive to a message failing to meet a single validation criterion, the message may be determined invalid.

At block 308, if second cross-chain messaging mechanism 122 determines that the message does not satisfy the validation criteria, then second cross-chain messaging mechanism 122 may reject the message. Method 300 then ends.

At block 310, if second cross-chain messaging mechanism 122 determines that the message satisfies the validation criteria, then second cross-chain messaging mechanism 122 may execute a transaction based on the message. Responsive to the message being concluded valid, second cross-chain messaging mechanism 122 may then execute the transaction based on the message, wherein executing the transaction based on the message may at least include generating a response message within the second subchain 120, aggregating a threshold number of sig. shares within the response message from a plurality of nodes, such as the n' member nodes, of subchain 120, and, responsive to the threshold number of sig. shares being aggregated within the response message, generating a threshold sig., adding the threshold sig. to the response message, and transmitting the response message to the first subchain 110, where, in some examples, the response message may be received by first cross-chain messaging mechanism 112. Method 300 may then end.

In this way, method 300 provides for a computationally efficient method for validating cross-chain messages received at a second subchain, from a first subchain, by evaluating one or more validation criteria associated with the message based on a threshold sig. included within the message, and further based on a public-key-share list of the first subchain stored in the second sub chain.

Turning to FIG. 4, a flowchart of an example method 400 for updating public-key-share lists via cross-chain messaging is shown. In the example shown by the flowchart of FIG. 4, the second subchain 120 receives an update message from the first subchain 110. In other examples, first subchain 110 may receive an update message from second subchain 120, first subchain 110 may receive an update message from another subchain, or second subchain 120 may receive an update message from another subchain, where another subchain may be neither the first subchain 110 nor the second subchain 120. In some examples, updating public-key-share lists may occur periodically based on a pre-determined period of time elapsing since a last public-key-share list update. In some examples, updating public-key-share lists may occur in substantially real time responsive to addition of one or more nodes to first subchain 110 or responsive to removal of one or more nodes from first subchain 110.

At block 402, the update message may be received at a smart contract, such as second cross-chain messaging mechanism 122, of second subchain 120. In one example, the update message may originate at another smart contract, such as first cross-chain messaging mechanism 112 of first subchain 110. Second cross-chain messaging mechanism 122 may at least include a public-key-share list of a plurality of public-key-shares corresponding to the plurality of nodes of first subchain 110. Further, the update message may at least include an updated plurality of public-key-shares corresponding to the plurality of nodes in first subchain 110. In some examples, the update message may further include a threshold sig. (e.g., generated by another smart contract, such as first cross-chain messaging mechanism 112) and/or an updated plurality of sig. shares (e.g., from the plurality of nodes of first subchain 110). As described at further blocks of method 400, second cross-chain messaging mechanism 122 may determine if the update message is valid based on the plurality of public-key-shares included in the message.

At block 404, validation criteria may be evaluated for the update message in a manner substantially similar to that described in method 300 with reference to step 304. In one example, the validation criteria may at least include determining if the threshold sig. included within the message is valid, by decrypting the threshold sig. to obtain a first hash using a public-key generated from the plurality of public-key-shares included within the message. Further embodiments and/or variations of validation criteria as detailed elsewhere herein may be added or substituted to the validation criteria described in reference to block 404 without limiting the scope of method 400.

At block 406, second cross-chain messaging mechanism 122 may determine whether or not the update message satisfies the validation criteria in a manner substantially similar to that described in method 300 with reference to step 306. In some examples, second cross-chain messaging mechanism 122 determining whether or not the message satisfies the validation criteria may include satisfying each of a plurality of validation criteria.

At block 408, if second cross-chain messaging mechanism 122 determines that the update message does not satisfy the validation criteria, then second cross-chain messaging mechanism 122 may reject the update message. Method 400 then ends.

At block 410, if second cross-chain messaging mechanism 122 determines that the update message satisfies the validation criteria, then second cross-chain messaging mechanism 122 may update the node list and the public-key-share list based on the update message. Method 400 then ends.

Turning now to FIG. 5, flow diagram 500 of a process for cross-chain messaging communication and validation is shown. Flow diagram 500 illustrates the communication/data transfer between member nodes of subchains, such as first subchain 110 and second subchain 120, which may occur as part of executing a method for cross-chain messaging communication and/or validation (such as methods 200, 300, and/or 400). Flow diagram 500 comprises first subchain 110 and second subchain 120, wherein first subchain 110 includes at least first cross-chain messaging mechanism 112, first node 504, and $m^{th}$ node 506, and the second subchain includes at least second cross-chain messaging mechanism 122. Flow diagram 500 includes an ellipsis between first node 502 and $m^{th}$ node 504, indicating that any number of intervening nodes may occur between first node 502 and $m^{th}$ node 504, such that at least m distinct member nodes may be within first subchain 110. Further member nodes may exist being the m distinct member nodes such that first subchain 110 may have n total member nodes. Second subchain 120 may have a substantially similar configuration (not depicted in FIG. 5). Second subchain 120 may further include a public-key-share list of first subchain 110. In flow diagram 500, the direction of communication is from first subchain 110 to second subchain 120. In other examples, the direction of communication may be from second subchain 120 to first subchain 110, from first subchain 110 to another subchain, or from second subchain 120 to another subchain, where another subchain may be neither first subchain 110 or second subchain 120.

Starting at 508, flow diagram 500 includes first cross-chain messaging mechanism generating a message (e.g., at 510). In one example, cross-chain messaging mechanism may receive a message from one or more member nodes, and may generate message based on the received message from the one or more member nodes. Once the cross-chain messaging mechanism 112 has generated a message, the message may then propagate through the member nodes of first subchain 110, starting at first node 502.

Next, at 512, flow diagram 500 includes first node 502 signing the message with a first sig. share. As first node 502 has access at 512 only to its own sig. share, the message may not comprise a threshold sig., as m or more sig. shares are required to produce a threshold sig. (wherein, as above, m is a predetermined, positive integer, not greater than n, and greater than 1).

At 514, flow diagram 500 includes first node 502 adding a first public-key-share corresponding to first node 502 to the message.

At 516, the message then propagates through additional member nodes until the message reaches an $m^{th}$ node 504 at 518. Similar to the above description, an ellipsis between 516 and 518 indicates that any number of intervening nodes may occur between first node 502 and $m^{th}$ node 504, such that the message may propagate through each of the intervening nodes, which may comprise substantially any positive integer number of nodes. The above approach may be considered a series approach, as a message may be signed by m nodes, one after another, in series, until m sig. shares are aggregated within the message, and the message is transmitted to the second subchain 120. In an alternative example, not illustrated by FIG. 5, each node of the first subchain 110 may sign the message in parallel. As an example, nodes of subchain 110 may receive an indication via a cross-chain messaging mechanism that a message is awaiting approval by member nodes of the first subchain 110, or in other words, that a message is awaiting aggregation of sufficient sig. shares, and in response, one or more member nodes of subchain 110 may sign the message by adding its sig. share to the message, wherein each sig. share may uniquely correspond with a member node of first subchain 110. In the above example, adding sig. shares in parallel may further increase a speed of message approval, and may thereby further increase a rate of cross-chain messaging, which may be advantageous in cases where a large number of cross-chain messages are to be sent.

At 520, flow diagram 500 includes $m^{th}$ node 504 signing the message with an $m^{th}$ sig. share.

At 522, flow diagram 500 includes $m^{th}$ node 504 adding an $m^{th}$ public-key-share corresponding to $m^{th}$ node 504 to the message.

At 524, the message returns to the first cross-chain messaging mechanism 112. Therein the message may at least include sig. shares and public-key-shares for first node 502, $m^{th}$ node 504, and all intervening nodes therebetween. As such, the message may include m sig. shares and m corresponding public-key-shares from m distinct member nodes of first subchain 110 and m public-key-shares from the m signing member nodes of the first subchain 110. In some examples, the message may further include a list of the at least m distinct member nodes of first subchain 110, which in one example may comprise a list of at least m distinct wallet addresses corresponding to the m distinct member nodes of first subchain 110.

At 526, flow diagram 500 includes first cross-chain messaging mechanism 112 signing the message with a threshold sig. (e.g., the message further comprises the threshold sig.) The threshold sig. may only be generated upon aggregation of m or more sig. shares, and may therefore indicate that the message has been approved by m or more of the n total member nodes of first subchain 110.

At 530, the message is received at second cross-chain messaging mechanism 122 of second subchain 120 from first cross-chain messaging mechanism 112 of first subchain 110.

At 532, flow diagram 500 includes comparing the public-key-shares included in the message against the public-key-share list of the first subchain 110 stored in the cross-chain messaging mechanism 122 of the second subchain 120. In one example, step 532 comprises determining if the message satisfies a first validation criterion. In one example, determining if the message satisfies the first validation criterion may comprise determining if the at least m public-key-shares included in the message are also included within the public-key-share list, and responding to the at least m public-key-shares being included within the public-key-share list by concluding that the public-key-shares included in the message are valid, and represent distinct member nodes of the first subchain 110.

At 534, flow diagram 500 includes determining if the message satisfies a second validation criterion. Wherein, in one example, determining if the message satisfies the second validation criterion may comprise decrypting the threshold signature using a group public-key determined based on the at least m public-key-shares to obtain a first value, calculating a second value based on contents/body of the message, comparing the first value with the second value, and responding to the first value equaling the second value by concluding that the message satisfies the first validation criterion. In the above example, both the first and the second value may comprise hashes, according to a hashing algorithm known in the art of cryptography.

Finally, at 536, flow diagram 500 includes, responsive to the first validation criterion (step 532) and the second validation criterion (step 534) being satisfied, executing a transaction in second subchain 120 based on the message.

In this way, the method of flow diagram 500 may enable computationally efficient cross-chain communication between a first and second subchain of a large scale decentralized network, and reduce the probability of cross-chain messages being forged or tampered with, by including a threshold sig. and a plurality of public-key-shares within cross-chain messages, and by further including a public-key-share list of the first subchain in a cross-chain messaging mechanism of the second subchain, wherein the first subchain generates and sends the message, and wherein the second subchain receives and validates the message based on the included threshold sig. and public-key-shares using the public-key-share list.

Turning now to FIG. 6, a schematic block diagram of an apparatus 600 is shown. The apparatus 600 (such as first cross-chain messaging mechanism 112 or second cross-chain messaging mechanism 122) may correspond to one or more nodes of a subchain (such as first subchain 110 or second subchain 120) operating within a large-scale decentralized network (such as large-scale decentralized network 100), configured to enable methods of cross-chain messaging communication and validation, as described above with reference to FIGS. 2-5.

The apparatus 600 may include one or more processors 602 coupled to at least one memory 604, wherein the one or more processors 602 may be configured to access and execute computer-executable instructions stored in at least one memory 604. The processor 602 may be implemented as appropriate in hardware, software, firmware, or combinations thereof. Software or firmware implementations of the processor 602 may include computer-executable or machine-executable instructions written in any suitable programming language to perform the various functions described herein. The processor 602 may include, without limitation, a central processing unit (CPU), a digital signal processor (DSP), a reduced instruction set computer (RISC) processor, a complex instruction set computer (CISC) processor, a microprocessor, a microcontroller, a field programmable gate array (FPGA), a System-on-a-Chip (SOC), or any combination thereof. The apparatus 600 may also include a chipset (not shown) for controlling communications between the processor 602 and one or more of the other components of the apparatus 600. The processor 602 may also include one or more application-specific integrated circuits (ASICs) or application-specific standard products (ASSPs) for handling specific data processing functions or tasks.

The memory 604 may include, but is not limited to, random access memory (RAM), flash RAM, magnetic media storage, optical media storage, and so forth. The memory 604 may include volatile memory configured to store information when supplied with power and/or non-volatile memory configured to store information even when not supplied with power. The memory 604 may store various program modules, application programs, and so forth that may include computer-executable instructions that upon execution by the processor 602 may cause various operations to be performed. The memory 604 may further store a variety of data manipulated and/or generated during execution of computer-executable instructions by the processor 602.

The one or more processors 602 may further be coupled to one or more network interfaces 606 that may facilitate communication between the apparatus 600 and one or more other nodes using any suitable communications standard. For example, a LAN interface may implement protocols and/or algorithms that comply with various communication standards of the Institute of Electrical and Electronics Engineers (IEEE), such as IEEE 802.11, while a cellular network interface implement protocols and/or algorithms that comply with various communication standards of the Third Generation Partnership Project (3GPP) and 3GPP2, such as 3G and 4G (Long Term Evolution), and of the Next Generation Mobile Networks (NGMN) Alliance, such as 5G.

The memory 604 may store various program modules, application programs, and so forth that may include computer-executable instructions that upon execution by the processor 602 may cause various operations to be performed. For example, the memory 604 may include an operating system module (O/S) 608 that may be configured to manage hardware resources such as the network interface 606 and provide various services to applications executing on the apparatus 600.

The memory 604 may store additional program modules such as one or more cross-chain messaging modules 610, each of which includes functions in the form of logic and rules that support and enable cross-chain messaging communication and validation between subchains in a large-scale decentralized network, as described above in reference to FIGS. 2-5. Each of the one or more cross-chain messaging modules 610 includes computer-executable instructions that when executed by the processor 602 cause various operations to be performed, such as the operations described above in reference to FIGS. 2-5. Each of the one or more cross-chain messaging modules 610 may further include one or more public-key-share lists.

In one example, the one or more processors 602 may be configured to receive a message from second subchain 120 via network interface 606, determine if the message is valid based on public-key-share list 612, and, responsive to the message being concluded valid, execute a transaction based on the message, wherein public-key-share list 612 may at least include a plurality of public-key-shares corresponding to the plurality of nodes in second subchain 120. Therein, the message may at least include a first threshold sig., a second plurality of node IDs, wherein the second plurality of node IDs corresponds to the plurality of sig. shares.

In some examples, the one or more processors 602, being configured to determine if the message is valid by executing one or more steps of one or more methods herein disclosed. In some examples, the one or more processors 602 may be configured to execute a transaction based on the message, and may therefore generate a response message, aggregate a threshold number of sig. shares within the response message from a plurality of nodes of first subchain 110, and, responsive to the threshold number of sig. shares being aggregated within the response message, generate a second threshold sig., add the second threshold sig. to the response message, and transmit the response message to second subchain 120 via network interface 606.

The apparatus 600 and cross-chain messaging module 610 disclosed herein may be implemented in hardware or software that is executed on a hardware platform. The hardware or hardware platform may be a general purpose processor, a digital signal processor (DSP), an application specific integrated circuit (ASIC), a field programmable gate array (FPGA) or other programmable logic component, discrete gate or transistor logic, discrete hardware components, or any combination thereof, or any other suitable component designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP, or any other such configuration.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, a smart card, a flash memory device (e.g., card, stick, key drive), random access memory (RAM), read only memory (ROM), programmable ROM (PROM), erasable PROM (EPROM), electrically erasable PROM (EEPROM), a general register, or any other suitable non-transitory medium for storing software.

Turning now to FIG. 7, an example message 700 is shown according to embodiments of the current disclosure. Message 700 may comprise a message generated by a first subchain to be transmitted to a second subchain, as discussed above in reference to FIGS. 1-6. Message 700 may be generated in a first subchain by a cross-chain messaging mechanism (e.g., smart contract), wherein the cross-chain messaging mechanism may be stored on, and implemented by, each of the member nodes of the first subchain. Message 700 may be used as part of a communication scheme between subchains, as discussed in more detail above, and may comprise information which, when used in conjunction with one or more of the methods disclosed herein, may enable a recipient subchain to authenticate that a given message originated from an indicated subchain and that the message was generated according to a consensus protocol and was not tampered with between the time of signing and the time of delivery to the recipient subchain.

Message 700 may comprise text 702. Text 702 may comprise any manner of data, such as alpha-numeric data, which may be encoded in various formats, such as binary, hexadecimal, etc. In one example, text 702 may comprise a function (or smart contract) call, wherein the function (or smart contract) is stored in the recipient subchain, and upon receipt and validation of message 700, a call to the function/smart contract is made. In response, the recipient subchain may transmit a response message to the subchain from which message 700 originated, in order to satisfy the function call. As one specific example, text 702 may comprise a call to a random number generator function from a first subchain, and in response to receiving and validating message 700, a second subchain comprising a random number generating function, may produce a random number in response to the message (specifically, in response to text 702), and the second subchain may further transmit a response message to the first subchain, wherein the response message may comprise the requested random number. In another example, text 702 may comprise a transaction request, such as a request to move an amount of funds from a first wallet address to a second wallet address, wherein the first and the second wallets may be stored on the recipient subchain. Upon receipt and validation of the message, the requested transaction may be executed, and a confirmation message, confirming that the transaction was executed, may be sent to the subchain from which the request originated. In yet another example, text 702 may comprise data, such as a table, list, or other data structure. In a more specific example, text 702 may comprise an updated node ID list and an updated public-key-share list, which may be used in conjunction with a method, such as method 400 discussed above, to update a node ID list and a public-key-share list of a first subchain stored in a second subchain, thereby enabling the second subchain to validate messages received from the first subchain, even as nodes join and leave the first subchain.

Message 700 may further comprise a threshold sig. 704, indicating that m or more member nodes of the subchain from which message 700 originates have agreed to the contents of the message according to a consensus protocol (wherein the contents refers to text 702). As discussed previously, a threshold sig. of a message may only be generated from m or more sig. shares for the message, thus a message may only obtain a threshold sig. after aggregating m or more sig. shares from m or more distinct member nodes of a subchain. Threshold sig. 704 may comprise a threshold sig. generated according to a BLS signature scheme. A property of BLS signatures is that a BLS threshold sig. is equivalent to a signature produced by a group private key (also referred to herein as a group secret, or group secret key), and therefore a threshold sig. may be decrypted using a group public key (as a property of asymmetric key cryptography is that information encrypted by a private key may be decrypted by a corresponding public key, and information encrypted with a public key may be decrypted only by a corresponding private key). Further, in a BLS signature scheme, a group public key may be determined from m or more public-key-shares in a manner analogous to how a threshold sig. is determined from m or more sig. shares. Thus, m or more nodes may cooperate to sign a message with m or more sig. shares, to produce a threshold sig. which may be equivalent to signing the message with the group secret (the group private key), with the added benefit that no single party may determine the identity of the group secret, thereby requiring at least m nodes to cooperate and thereby preventing any single node from unilaterally approving of messages.

The m or more sig. shares from which the threshold sig. 704 is produced may optionally be included within message 700, as shown by sig. shares 730. Sig. shares 730 may include each of the m or more sig. shares used to produce threshold sig. 704. As shown, sig. shares 730 comprises a $1^{st}$ sig. share 732, through $m^{th}$ sig. share 734. The ellipsis between $1^{st}$ sig. share 732 and $m^{th}$ sig. share 734 indicate intervening sig. shares which may be included but not shown, such as when m is greater than two. As a specific example, if m is equal to five, the ellipsis between $1^{st}$ sig. share 732 and $m^{th}$ sig. share 734 may indicate the three additional sig. shares.

Message 700 may further include public-key-shares 720, which may correspond to the node IDs 710 and optionally correspond to the sig. shares 730. Public-key-shares 720 may comprise a $1^{st}$ public-key-share 722 through an $m^{th}$ public-key-share 724, with the intervening ellipsis indicating an integer number of intervening public-key-shares. In one example, the ellipsis between $1^{st}$ public-key-share 722 and $m^{th}$ public-key-share 724 may represent zero public-key-shares. In another example, the ellipsis between $1^{st}$ public-key-share 722 and $m^{th}$ public-key-share 724 may comprise a positive, non-zero, integer number of public-key-shares. In one example, each public-key-share within public-key-shares 720 may comprise a BLS public-key-share, and may therefore have the property that m or more public-key-shares may be used to determine a group public key via polynomial interpolation. In one example, a subchain receiving message 700 may determine a group public key from public-key-shares included in public-key-shares 720. A group public key (which may herein also be referred to as a public key) may be used to decrypt threshold sig. 704.

Thus, message 700 may be transmitted from a first, originating subchain to a second, recipient subchain, and may enable the recipient subchain to determine message 700 comprises an unaltered message generated by the first subchain based on the information enclosed within message 700, public-key-shares 720, threshold sig. 704, and optionally, sig. shares 730. In this way, subchains communicating through transmission of messages may efficiently validate the authenticity of received messages, without transmitting multiple messages, thus reducing a vulnerability to hackers/malicious actors, while simultaneously reducing a computational/communication complexity.

The current disclosure provides for a cross-chain messaging scheme, wherein messages generated by a first subchain comprise at least a plurality of public-key-shares, and a threshold sig., wherein the threshold sig. is generated based on a plurality of sig. shares provided by member nodes of the first subchain. By including public-key-shares of the member nodes of the first subchain from which the sig. shares were obtained, a second subchain, which receives the message, may determine if the message is an authentic and unaltered message from the first subchain. In one example, by comparing the plurality of public-key-shares within the message against a public-key-share list of the first subchain, the second subchain may ascertain if the public-key-shares included within the message correspond to valid public-key-shares of the first subchain recorded in the public-key-share list stored the second subchain. A technical effect of signing an inter-chain message with a threshold sig. determined from a threshold number of sig. shares, and including a plurality of public-key-shares corresponding to the sig. shares within the message, is that a recipient subchain may validate the message is authentic (that is, originates from the indicated subchain, and the contents of the message are unaltered since the time the message was signed) by comparing the plurality of public-key-shares included in the message against a public-key-share list. A further technical effect of the above message validation method is that said validation may be conducted without transmission/reception of multiple messages, and thereby a computational/communication complexity may be reduced. Further, according to the above described systems and methods, no single node may act as a single point of failure, thereby decentralizing and securing inter-chain communication. A further technical effect of utilizing a single message for validation purposes is that time and computational resources/bandwidth may be significantly reduced relative to multiple-message based validation.

The disclosure also provides support for a method comprising: receiving a first message from a first subchain at a smart contract of a second subchain, wherein the smart contract comprises a node list and a public-key-share list; determining if the first message is valid based on the node list and the public-key-share list; and executing a transaction based on the first message responsive to the first message being concluded valid. In a first example of the method, wherein the node list of the smart contract comprises a first plurality of node IDs corresponding to a plurality of nodes in the first subchain, and wherein the public-key-share list of the smart contract comprises a plurality of public-key-shares corresponding to the plurality of nodes of the first subchain. In a second example of the method, optionally including the first example, the method further comprising updating the node list and the public-key-share list. In a third example of the method, optionally including the first and second examples, wherein updating the node list and the public-key-share list occurs periodically based on a pre-determined period of time, and comprises the smart contract of the second subchain receiving a second message from the first subchain, wherein the second message comprises an updated plurality of node IDs and an updated plurality of public-key-shares. In a fourth example of the method, optionally including the first through third examples, wherein updating the node list and the public-key-share list occurs responsive to addition of one or more nodes to the first subchain or responsive to removal of one or more nodes from the first subchain, and comprises the smart contract of the second subchain receiving a second message from the first subchain, wherein the second message comprises an updated plurality of node IDs and an updated plurality of public-key-shares. In a fifth example of the method, optionally including the first through fourth examples, wherein the first message comprises: a threshold signature; a plurality of signature shares; and a second plurality of node IDs, wherein the second plurality of node IDs corresponds to the plurality of signature shares. In a sixth example of the method, optionally including the first through fifth examples, wherein determining if the first message is valid based on the node list and the public-key-share list comprises: determining if each of the second plurality of node IDs of the first message is included within the node list; and responsive to each of the second plurality of node IDs of the first message being included within the node list, concluding that the first message is valid. In a seventh example of the method, optionally including the first through sixth examples, wherein determining if the first message is valid based on the node list and the public-key-share list comprises: determining if each of the plurality of signature shares of the first message is valid based on the public-key-share list; responsive to each of the plurality of signature shares of the first message being concluded valid, concluding that the first message is valid. In an eighth example of the method, optionally including the first through seventh examples, wherein determining if each of the plurality of signature shares of the first message is valid based on the public-key-share list comprises: calculating a hash of the first message; and decrypting the plurality of signature shares of the first message with the plurality of public-key-shares to obtain a plurality of hashes; comparing the hash with the plurality of hashes; and responsive to the plurality of hashes matching the hash, concluding that each of the plurality of signature shares of the first message is valid. In a ninth example of the method, optionally including the first through eighth examples, wherein executing the transaction based on the first message comprises: generating a response message within the second subchain; aggregating a threshold number of signature shares within the response message from a plurality of nodes of the second subchain; and responsive to the threshold number of signature shares being aggregated within the response message: generating a threshold signature; adding the threshold signature to the response message; and transmitting the response message to the first subchain.

The disclosure also provides support for a cross-chain messaging mechanism in a first subchain comprising: a network interface; a memory comprising a node list and a public-key-share list; and a processor coupled to the network interface and the memory and configured to: receive a message from a second subchain via the network interface; determine if the message is valid based on the node list and the public-key-share list; and execute a transaction based on the message responsive to the message being concluded valid, wherein the node list comprises a first plurality of node IDs corresponding to a plurality of nodes in the second subchain, and wherein the public-key-share list comprises a plurality of public-key-shares corresponding to the plurality of nodes of the second subchain. In a first example of the system, wherein the message comprises: a first threshold signature; a plurality of signature shares; and a second plurality of node IDs, wherein the second plurality of node IDs corresponds to the plurality of signature shares. In a second example of the system, optionally including the first example, wherein the processor is configured to determine if the message is valid based on the node list and the public-key-share list by: determining if each of the second plurality of node IDs of the message is included within the node list; determining if each of the plurality of signature shares of the message is valid based on the public-key-share list; and responsive to each of the second plurality of node IDs of the message being included within the node list and further responsive to each of the plurality of signature shares of the message being concluded valid, concluding that the message is valid. In a third example of the system, optionally including the first and second examples, wherein the processor is further configured to determine if the message is valid based on the node list and the public-key-share list by: generating a second threshold signature from the plurality of signature shares of the message via polynomial interpolation; determining if the second threshold signature is equivalent to the first threshold signature; and responsive to the first threshold signature being equivalent to the second threshold signature, concluding that the message is valid. In a fourth example of the system, optionally including the first through third examples, wherein the processor is configured to execute the transaction based on the message by: generating a response message; aggregating a threshold number of signature shares within the response message from a plurality of nodes of the first subchain; and responsive to the threshold number of signature shares being aggregated within the response message: generating a second threshold signature; adding the second threshold signature to the response message; and transmitting the response message to the second subchain via the network interface.

The disclosure also provides support for a method comprising: receiving a message at a first subchain from a second subchain, wherein the first subchain comprises a node list and a public-key-share list; determining if the message satisfies at least a first validation criterion based on the node list and a second validation criterion based on the public-key-share list of the first subchain; responsive to the first validation criterion and the second validation criterion of the first subchain being satisfied: executing a transaction in the first subchain based on the message. In a first example of the method, wherein the message comprises: a threshold signature; at least m signature shares from m distinct member nodes of the second subchain; and a list of the at least m distinct member nodes of the second subchain, wherein the list of the at least m distinct member nodes of the second subchain indicates from which of the at least m distinct member nodes each of the at least m signature shares originates. In a second example of the method, optionally including the first example, wherein determining if the message satisfies the first validation criterion based on the node list comprises: determining if node IDs of each of the at least m distinct member nodes of the second subchain are within the node list of the second subchain at the first subchain; and responsive to node IDs of each of the at least m distinct member nodes of the second subchain being within the node list of the second subchain at the first subchain, satisfying the first validation criterion. In a third example of the method, optionally including the first and second examples, wherein determining if the message satisfies the second validation criterion based on the public-key-share list comprises: determining if each of the at least m signature shares of the message is valid by: decrypting each of the at least m signature shares with the public-key-share list to generate at least m hashes; determining if each of the at least m hashes are numerically equivalent to a hash calculated by the first subchain based on the message; and responsive to the at least m hashes matching the hash calculated by the first subchain based on the message, satisfying the second validation criterion. In a fourth example of the method, optionally including the first through third examples, wherein the list of the at least m distinct member nodes of the second subchain comprises a list of at least m distinct wallet addresses corresponding to the m distinct member nodes of the second subchain.

The various aspects of this disclosure are provided to enable one of ordinary skill in the art to practice the present invention. Various modifications to exemplary embodiments presented throughout this disclosure will be readily apparent to those skilled in the art. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. No claim element is to be construed under the provisions of 35 U.S.C. § 112, sixth paragraph, unless the element is expressly recited using the phrase "means for" or, in the case of a method claim, the element is recited using the phrase "step for."

Those having skill in the art will appreciate that there are various logic implementations by which processes and/or systems described herein can be effected (e.g., hardware, software, and/or firmware), and that the preferred vehicle will vary with the context in which the processes are deployed. "Software" refers to logic that may be readily readapted to different purposes (e.g. read/write volatile or nonvolatile memory or media). "Firmware" refers to logic embodied as read-only memories and/or media. Hardware refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory.

In a general sense, those skilled in the art will recognize that the various aspects described herein which can be implemented, individually and/or collectively, by a wide range of hardware, software, firmware, or any combination thereof can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one Application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuits forming a communications device. (e.g., a modem, communications switch, or the like)

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and sub combinations of the various processes, systems and configurations, and other features, functions, acts, and/or properties disclosed herein, as well as any and all equivalents thereof.

The following claims particularly point out certain combinations and sub-combinations regarded as novel and nonobvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A method comprising:
receiving a first message from a first subchain at a smart contract of a second subchain, wherein the smart contract of the second subchain comprises a public-key-share list of the first subchain, wherein the first message comprises a threshold signature of the first subchain that indicates the first message is approved by a consensus of member nodes of the first subchain according to a pre-agreed-upon consensus protocol known to both the first subchain and the second subchain;
validating the first message based on validation criteria, comprising (1) determining if the first message is valid based on the public-key-share list, and (2) determining if the first message is valid based on the threshold signature included in the first message, including validating the threshold signature is validated by a group public key derived from a plurality of key shares of the public-key-share list of the first subchain stored in the second subchain according to the pre-agreed-upon consensus protocol known to both the first subchain and the second subchain; and
executing a transaction based on the first message responsive to the first message being determined valid.

2. The method of claim 1, wherein the public-key-share list of the smart contract of the second subchain comprises a first plurality of public-key-shares corresponding to a plurality of nodes of the first subchain.

3. The method of claim 2, the method further comprising updating the public-key-share list.

4. The method of claim 3, wherein updating the public-key-share list occurs periodically based on a pre-determined period of time, and wherein updating the public-key-share list comprises receiving at the smart contract of the second subchain a second message from the first subchain, wherein the second message comprises an updated public-key-share list of the first sub chain.

5. The method of claim 3, wherein updating the public-key-share list occurs responsive to addition of one or more nodes to the first subchain or responsive to removal of one or more nodes from the first subchain, and further comprises receiving at the smart contract of the second subchain a second message from the first subchain, wherein the second message comprises an updated public-key-share list of the first subchain.

6. The method of claim 2, wherein the first message further comprises:
a second plurality of public-key-shares.

7. The method of claim 6, wherein determining if the first message is valid based on the public-key-share list comprises:
determining if each public-key-share of the second plurality of public-key-shares is included within the public-key-share list; and
determining if the threshold signature is valid based on the second plurality of public-key-shares.

8. The method of claim 7, wherein determining if the threshold signature is valid based on the second plurality of public-key-shares comprises:
decrypting the threshold signature to produce a value using the second plurality of public-key-shares; and
verifying the threshold signature based on the first message and further based on the value.

9. The method of claim 8, wherein the value comprises a hash of the first message.

10. A cross-chain messaging mechanism in a first subchain comprising:
a network interface;
a processor coupled to the network interface; and
a memory coupled to the processor comprising a public-key-share list and instructions executable by the processor to:
receive a first message from a first subchain at a second subchain via the network interface, wherein the second subchain comprises a public-key-share list of the first subchain, wherein the first message comprises a threshold signature of the first subchain that indicates the first message is approved by a consensus of a plurality of member nodes of the first subchain according to a pre-agreed-upon consensus protocol know to both the first subchain and the second subchain;
determine if the message is valid based on validation criteria, comprising (1) determining if the first message is valid based on the public-key-share list, and (2) determining if the first message is valid based on the threshold signature included in the first message, including validating the threshold signature is validated by a group key derived from a plurality of key shares of the public-key-share list of the first subchain stored in the second subchain according to the pre-agreed-upon consensus protocol known to the first subchain and the second subchain; and
respond to the message being concluded valid by executing a transaction based on the message.

11. The cross-chain messaging mechanism of claim 10, wherein the message further comprises:
a second plurality of public-key-shares.

12. The cross-chain messaging mechanism of claim 11, wherein the memory further includes instructions to determine if the message is valid based on the public-key-share list by:
determining if each public-key-share of the second plurality of public-key-shares is included within the public-key-share list; and
responding to each public-key-share of the second plurality of public-key-shares being included within the public-key-share list by concluding that the message is valid.

13. The cross-chain messaging mechanism of claim 12, wherein the memory further includes instructions to determine if the message is valid based on the public-key-share list by:
decrypting the first threshold signature with the second plurality of public-key-shares to obtain a first hash;
calculating a second hash based on the message;
comparing the first hash with the second hash; and
responding to the first hash matching the second hash by concluding that the message is valid.

14. The cross-chain messaging mechanism of claim 11, wherein the memory further includes instructions to execute the transaction based on the message by:
generating a response message;
aggregating a threshold number of signature shares within the response message from a plurality of nodes of the second subchain according to the consensus protocol known to both the first subchain and the second subchain; and
responding to the threshold number of signature shares being aggregated within the response message by:
generating a second threshold signature;
adding the second threshold signature to the response message; and
transmitting the response message to the first subchain via the network interface.

15. A method comprising:
receiving a message at a first subchain from a second subchain, wherein the first subchain comprises a public-key-share list of the second subchain, wherein the message comprises a threshold signature of the second subchain that indicates the message is approved by a consensus of member nodes of the second subchain according to a pre-agreed-upon consensus protocol know to both the first subchain and the second subchain;
determining if the message satisfies at least a first validation criterion and a second validation criterion based on the public-key-share list, including determining if the message is valid based on the threshold signature included in the message, including validating the threshold message includes a group public key derived from a plurality of key shares of the public-key-share list of the second subchain according to a pre-agreed-upon consensus protocol known to both the first subchain and the second subchain;
and
responsive to the first validation criterion and the second validation criterion being satisfied:
executing a transaction in the first subchain based on the message.

16. The method of claim 15, the message further comprising:
at least m public-key-shares from m distinct member nodes of the second subchain.

17. The method of claim 16, wherein determining if the message satisfies the first validation criterion comprises:
decrypting the threshold signature using a group public-key determined based on the at least m public-key-shares to obtain a first value;

calculating a second value based on the message;

comparing the first value with the second value; and responding to the first value equaling the second value by concluding that the message satisfies the first validation criterion.

18. The method of claim 17, wherein first value comprises a first hash, and wherein the second value comprises a second hash.

19. The method of claim 16, wherein determining if the message satisfies the second validation criterion based on the public-key-share list comprises:

determining if the at least m public-key-shares are included within the public-key-share list; and responding to the at least m public-key-shares being included within the public-key-share list by concluding that the message satisfies the second validation criterion.

20. The method of claim 1, wherein executing the transaction based on the first message comprises: generating a response message within the second subchain; aggregating a threshold number of signature shares within the response message from a plurality of nodes of the second subchain; and responsive to the threshold number of signature shares being aggregated within the response message: generating a threshold signature; adding the threshold signature to the response message; and transmitting the response message to the first subchain.

21. A method comprising:

receiving a first message from a first subchain at a smart contract of a second subchain, wherein the smart contract of the second subchain comprises a public-key-share list of the first subchain;

determining if the first message is valid based on the public-key-share list;

executing a transaction based on the first message responsive to the first message being determined valid; and producing a threshold number of signature shares from a signature share comprising m or more signature shares, wherein executing the transaction based on the first message comprises: generating a response message within the second subchain;

aggregating the threshold number of signature shares within the response message from a plurality of nodes of the second subchain; and responsive to the threshold number of signature shares being aggregated within the response message: generating a threshold signature; adding the threshold signature to the response message; and transmitting the response message to the first subchain.

* * * * *